United States Patent
Lehmberg

(10) Patent No.: US 7,603,805 B1
(45) Date of Patent: Oct. 20, 2009

(54) FISH CATCHING SYSTEM

(76) Inventor: Ned W. Lehmberg, 2790 N. 1050 East, Lehi, UT (US) 84043

( * ) Notice: Subject to any disclaimer, the term of this patent is extended or adjusted under 35 U.S.C. 154(b) by 68 days.

(21) Appl. No.: 11/850,735

(22) Filed: Sep. 6, 2007

(51) Int. Cl.
*A01K 73/00* (2006.01)

(52) U.S. Cl. ........................................ 43/8; 43/7; 43/11

(58) Field of Classification Search .................. 43/8, 43/7, 11
See application file for complete search history.

(56) References Cited

U.S. PATENT DOCUMENTS

| | | | |
|---|---|---|---|
| 2,289,592 A * | 7/1942 | Riedi ........................ | 248/514 |
| 3,593,949 A | 7/1971 | Fliege | |
| 3,636,649 A | 1/1972 | Paiva | |
| 4,611,427 A | 9/1986 | Coutcher | |
| 4,628,628 A * | 12/1986 | Burgin et al. ................. | 43/26 |
| 4,671,009 A * | 6/1987 | Faunce ....................... | 43/54.1 |
| 5,072,539 A * | 12/1991 | Greenberg .................. | 43/21.2 |
| D345,409 S | 3/1994 | Baynard | |
| 5,349,775 A | 9/1994 | Mondares | |
| 5,359,803 A | 11/1994 | Shieh | |
| 5,488,798 A | 2/1996 | Beachel | |
| 5,797,212 A * | 8/1998 | Kistner et al. ................ | 43/21.2 |
| 6,128,848 A | 10/2000 | Wong | |
| 2003/0230023 A1 | 12/2003 | Lu | |
| 2005/0005497 A1* | 1/2005 | Boltan et al. .................... | 43/7 |

* cited by examiner

*Primary Examiner*—Kurt Rowan

(57) ABSTRACT

A fish catching system for includes a fishing pole and a fishing net to receive a fish landed by a user of the fishing pole. A support assembly engages and extends between the fishing net and the fishing pole. The support assembly supports the fishing pole above the fishing net to support the fishing pole when the fishing net and fishing pole are being held by the user.

4 Claims, 3 Drawing Sheets

FISH CATCHING SYSTEM

BACKGROUND OF THE INVENTION

Field of the Invention

The present invention relates to fishing rod holders and more particularly pertains to a new fishing rod holder for to assist someone in holding a fishing rod while they also hold a fishing net.

SUMMARY OF THE INVENTION

The present invention meets the needs presented above by generally comprising a fishing pole. A fishing net receives a fish landed by a user of the fishing pole. A support assembly engages and extends between the fishing net and the fishing pole. The support assembly supports the fishing pole above the fishing net to support the fishing pole when the fishing net and fishing pole are being held by the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
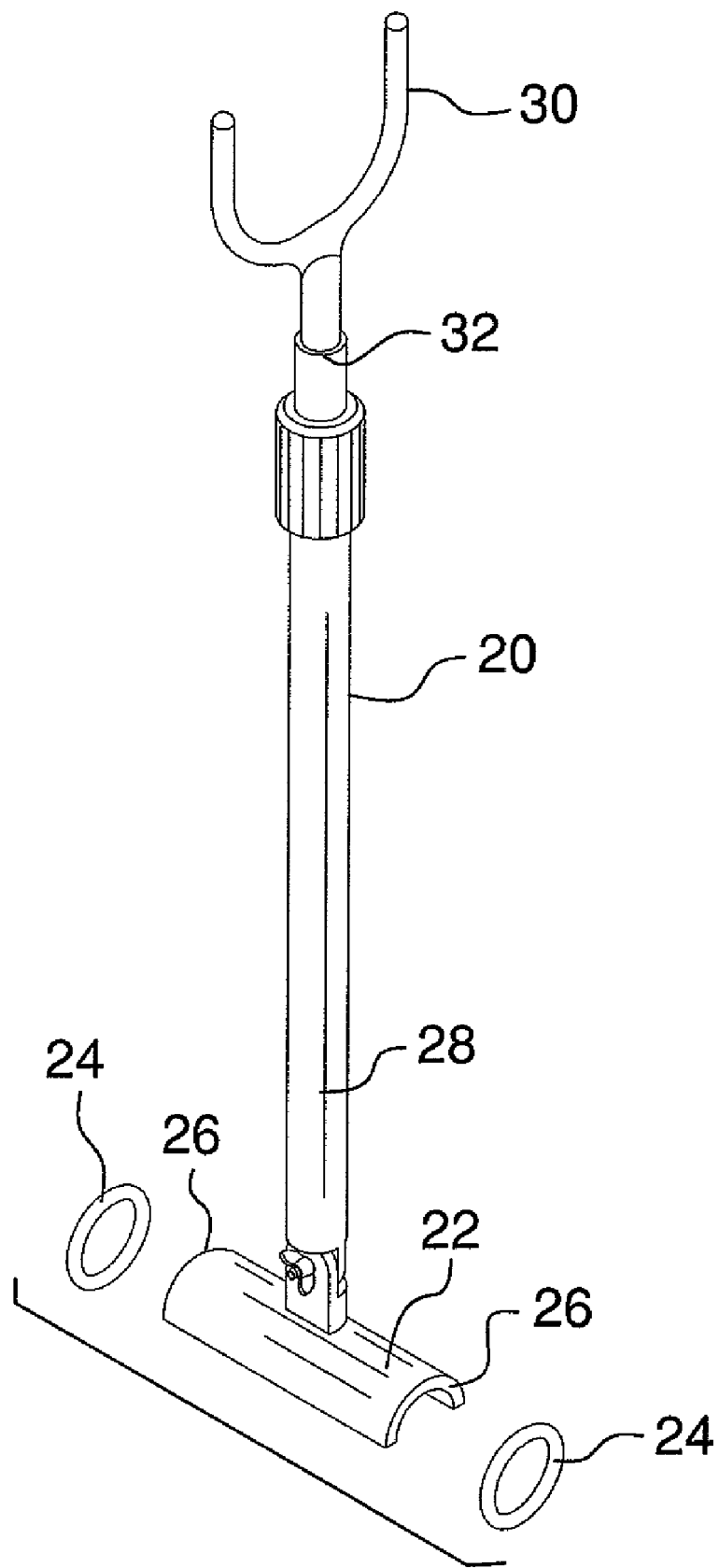
FIG. 1 is an exploded perspective view of a support assembly of a fish catching system according to the present invention.
Figure 2:
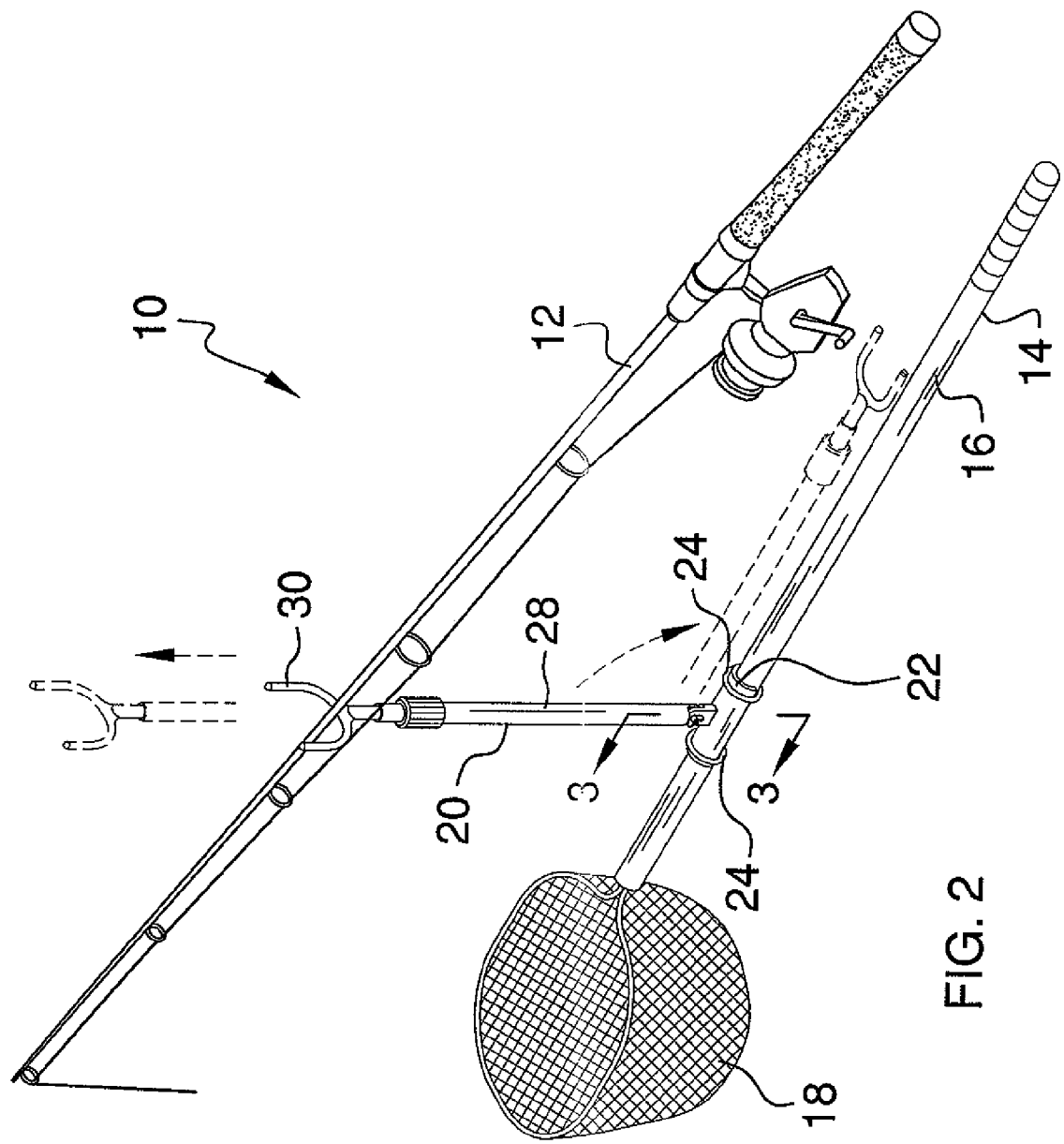
FIG. 2 is a perspective view of the present invention shown in use.
Figure 3:
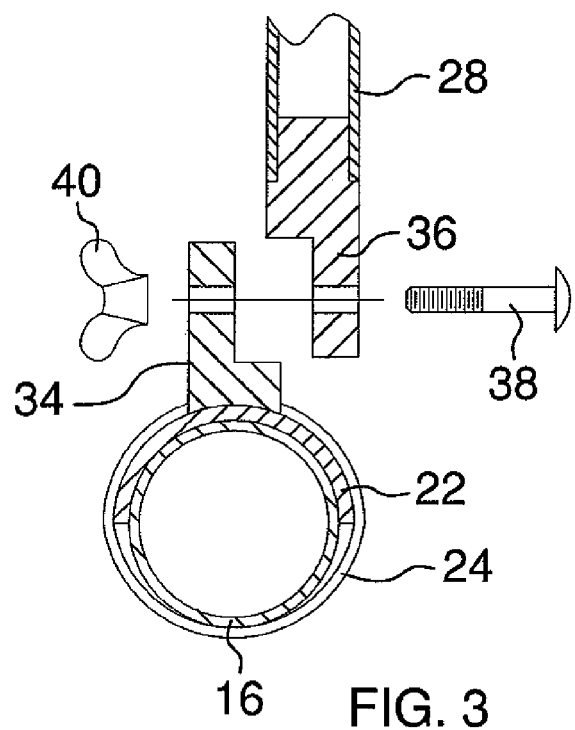
FIG. 3 is a cross-sectional view of the present invention taken along line 3-3 of FIG. 2.
Figure 4:
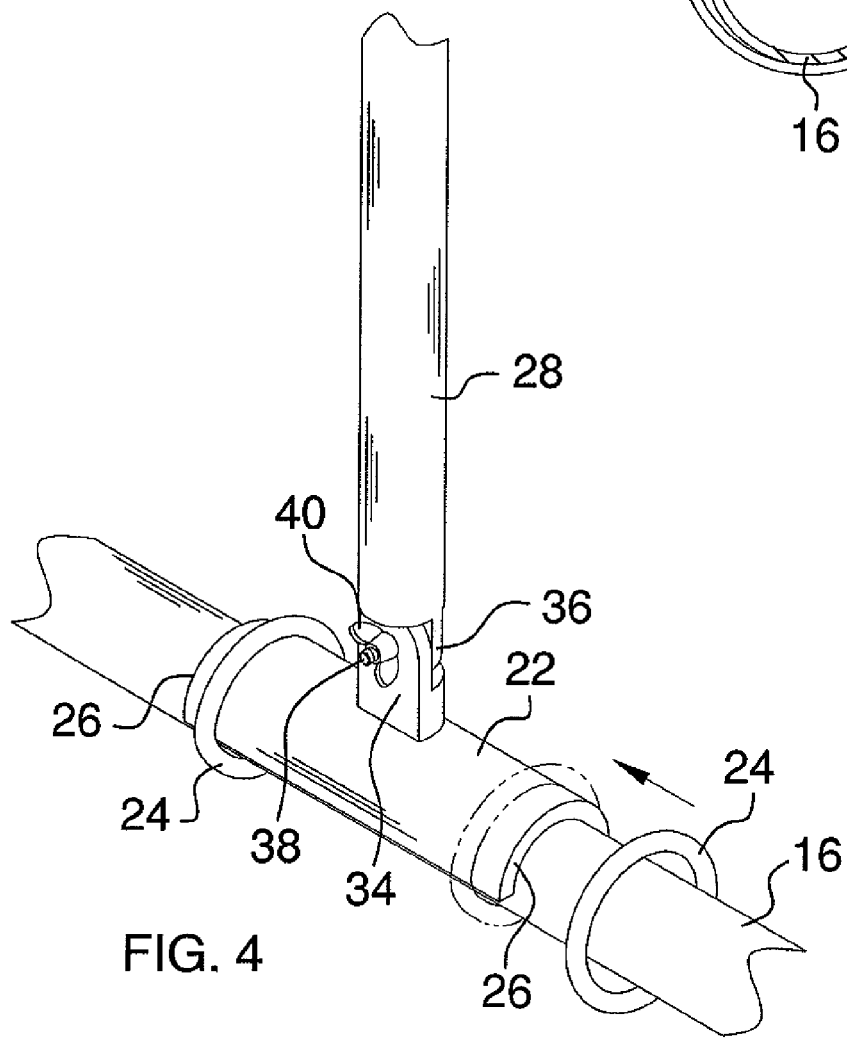
FIG. 4 is an enlarged perspective view of the saddle and the bands of the present invention.

With reference now to the drawings, and in particular to FIGS. 1 through 4 thereof, a new fishing rod holder embodying the principles and concepts of the present invention and generally designated by the reference numeral 10 will be described.

As best illustrated in FIGS. 1 through 4, the fish catching system 10 generally comprises a fishing pole 12. A fishing net 14 receives a fish landed by a user of the fishing pole 12. The fishing net 14 includes a handle rod 16 and a catch net 18 coupled to the handle rod 16. The handle rod 16 is graspable to facilitate manipulation of the catch net 18. The catch net 18 receives the fish caught on the fishing pole 12.

A support assembly 20 engages and extends between the fishing net 14 and the fishing pole 12. The support assembly 20 supports the fishing pole 12 above the fishing net 14 to support the fishing pole 12 when the fishing net 14 and fishing pole 12 are being held by the user or the fishing net 14 is placed on a support surface such as a deck or an edge of a boat. The support assembly 20 includes a saddle 22 mountable to the handle rod 16 of the fishing net 14. A plurality of bands 24 is extended around the saddle 22 and the handle rod 16 to secure the saddle 22 to the handle rod 16. Each of a pair of opposing ends 26 of the saddle 22 has one of the bands 24 positioned adjacent thereto. Each of the bands 24 is comprised of a resiliently elastic material to constrict around and frictionally couple together the saddle 22 and the handle rod 16.

The support assembly 20 also includes a stanchion 28 hingedly coupled to the saddle 22. The stanchion 28 is pivoted between a raised position and a lowered position. The lowered position is defined by the stanchion 28 being positioned adjacent and approximately parallel to the handle rod 16. The raised position is defined by the stanchion 28 extending upwardly from the handle rod 16. The stanchion 28 is telescopic to permit adjustment of a length of the stanchion 28. The stanchion 28 has a length that is adjustable between approximately 14 inches and 27 inches. An angle of stanchion 28 is adjustable between approximately parallel to the handle rod 16 and approximately 95 degrees with respect to the handle rod 16. A cradle 30 is coupled to a top end 32 of the stanchion 28. The cradle 30 receives the fishing pole 12 when the stanchion 28 is in the raised position. The cradle 30 supports the fishing pole 12 above the fishing net 14 when the cradle 30 receives the fishing rod. The cradle 30 is approximately U-shaped.

The support assembly 20 also includes a first hinge plate 34 and a second hinge plate 36. The first hinge plate 34 is coupled to the saddle 22 and approximately aligned with a longitudinal axis of the saddle 22. The second hinge plate 36 is coupled to the stanchion 28. A fastener 38 extends through the second hinge plate 36 and the first hinge plate 34 to allow the stanchion 28 to be rotated with respect to the saddle 22. A nut 40 threadably couples to the fastener 38. The nut 40 is rotated in a first direction to press the first hinge plate 34 against the second hinge plate 36 to secure the stanchion 28 at the desired angle. The nut 40 is rotated in a second direction to permit the first hinge plate 34 to rotate with respect to the second hinge plate 36.

In use, the saddle 22 is positioned on the handle rod 16 and the bands 24 positioned over the saddle 22 and around the handle rod 16 to secure the support assembly 20 to the handle rod 16. The stanchion 28 is pivoted to the raised position and lengthened to the desired length. The fishing pole 12 is placed in the cradle 30. As the fish caught on the fishing pole 12 is brought in for a landing the support assembly 20 facilitates keeping the fishing net 14 and the fishing pole 12 aligned to facilitate landing the fish in the catch net 18.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish catching system comprising:
   a fishing pole;
   a fishing net receiving fish landed by a user of said fishing pole;
   a support assembly engaging and extending between said fishing net and said fishing pole, said support assembly supporting said fishing pole above said fishing net to support said fishing pole when said fishing net and fishing pole are being held by the user;
   said fishing net including a handle rod and a catch net being coupled to said handle rod, said handle rod being graspable to facilitate manipulation of said catch net, said catch net receiving the fish caught on said fishing pole;
   said support assembly including:
   a saddle being mountable to said handle rod of said fishing net;
   a band being extended around said saddle and said handle rod to secure said saddle to said handle rod, said band being comprised of a resiliently elastic material to constrict around and frictionally couple together said saddle and said handle rod; and
   a stanchion being hingedly coupled to said saddle, said stanchion being pivoted between a raised position and a lowered position, the lowered position being defined by said stanchion being positioned adjacent and approximately parallel to said handle rod, the raised position being defined by said stanchion extending upwardly from said handle rod.

2. The system according to claim 1, wherein said support assembly includes said stanchion being telescopic to permit adjustment of a length of said stanchion.

3. The system according to claim 1, wherein said support assembly includes a cradle being coupled to a top end of said stanchion, said cradle receiving said fishing pole when said stanchion is in the raised position, said cradle supporting said fishing pole above said fishing net when said cradle receives said fishing rod.

4. A fish catching system comprising:
   a fishing pole;
   a fishing net receiving fish landed by a user of said fishing pole, said fishing net including a handle rod and a catch net being coupled to said handle rod, said handle rod being graspable to facilitate manipulation of said catch net, said catch net receiving the fish caught on said fishing pole;
   a support assembly engaging and extending between said fishing net and said fishing pole, said support assembly supporting said fishing pole above said fishing net to support said fishing pole when said fishing net and fishing pole are being held by the user;
     a saddle being mountable to said handle rod of said fishing net;
     a plurality of bands being extended around said saddle and said handle rod to secure said saddle to said handle rod, each of a pair of opposing ends of said saddle having one of said bands positioned adjacent thereto, each of said bands being comprised of a resiliently elastic material to constrict around and frictionally couple together said saddle and said handle rod;
     a stanchion being hingedly coupled to said saddle, said stanchion being pivoted between a raised position and a lowered position, the lowered position being defined by said stanchion being positioned adjacent and approximately parallel to said handle rod, the raised position being defined by said stanchion extending upwardly from said handle rod, said stanchion being telescopic to permit adjustment of a length of said stanchion; and
     a cradle being coupled to a top end of said stanchion, said cradle receiving said fishing pole when said stanchion is in the raised position, said cradle supporting said fishing pole above said fishing net when said cradle receives said fishing rod.

* * * * *